(12) United States Patent
Clochard

(10) Patent No.: US 8,550,529 B2
(45) Date of Patent: Oct. 8, 2013

(54) VEHICLE EQUIPMENT FOR A MOBILE APPLIANCE

(75) Inventor: Pascal Clochard, Chevreuse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 167 days.

(21) Appl. No.: 13/318,878

(22) PCT Filed: May 7, 2010

(86) PCT No.: PCT/EP2010/002800
§ 371 (c)(1),
(2), (4) Date: Nov. 4, 2011

(87) PCT Pub. No.: WO2010/127865
PCT Pub. Date: Nov. 11, 2010

(65) Prior Publication Data
US 2012/0061436 A1  Mar. 15, 2012

(30) Foreign Application Priority Data
May 7, 2009  (FR) ..................................... 09 02195

(51) Int. Cl.
*B60R 7/06* (2006.01)
(52) U.S. Cl.
USPC ........................ 296/37.12; 224/483; 224/929
(58) Field of Classification Search
USPC ........ 224/400, 483, 539, 544, 929; 248/27.1; 296/37.12, 24.34
See application file for complete search history.

(56) References Cited

U.S. PATENT DOCUMENTS

| 5,964,601 | A | 10/1999 | Tsurumaru et al. |
| 6,529,381 | B1 * | 3/2003 | Schoenfish .................... 361/725 |
| 7,097,082 | B2 * | 8/2006 | Wallaker ....................... 224/483 |
| 7,404,298 | B2 * | 7/2008 | Kim et al. ........................ 62/126 |
| 7,469,951 | B2 * | 12/2008 | Welschholz et al. ......... 296/37.8 |
| 7,650,230 | B1 * | 1/2010 | Laverick et al. .............. 701/491 |
| 7,900,988 | B2 * | 3/2011 | Ryu ........................... 296/37.12 |
| 8,172,293 | B2 * | 5/2012 | Lota et al. .................... 296/24.34 |
| 8,233,269 | B2 * | 7/2012 | Hotary et al. ............ 361/679.01 |
| 8,322,769 | B2 * | 12/2012 | Kuhlmann ................. 296/24.34 |
| 2002/0003875 | A1 | 1/2002 | Stewart et al. |

(Continued)

FOREIGN PATENT DOCUMENTS

DE  20 2004 008423 U1  10/2005
EP  1132258 A1 *  9/2001

(Continued)

OTHER PUBLICATIONS

International Search Report, dated Jul. 30, 2010, from corresponding to PCT application.

*Primary Examiner* — Justin Larson
(74) *Attorney, Agent, or Firm* — Young & Thompson

(57) ABSTRACT

A vehicle equipment designed to detachably hold an electronic appliance provided with a screen and manually activatable function keys. This equipment has a cavity (11) designed to hold the appliance and which for that purpose is open at the front. The cavity contains thrust elements (17, 19) in order to wedge the electronic appliance therein, and a cable guide shoe (160), urged by at least some of the thrust elements. This shoe has a passage, or a marked-out passage ready to be cut out (161) through which a lead and its connector (23, 23a) for connecting to the electronic appliance can pass.

10 Claims, 7 Drawing Sheets

(56) References Cited

U.S. PATENT DOCUMENTS

| | | | |
|---|---|---|---|
| 2005/0087654 A1* | 4/2005 | Fowler et al. | 248/27.1 |
| 2006/0284024 A1* | 12/2006 | Call et al. | 248/27.1 |
| 2007/0197271 A1 | 8/2007 | Haikola et al. | |
| 2010/0124005 A1* | 5/2010 | Hotary et al. | 361/679.01 |
| 2011/0156418 A1* | 6/2011 | Thorsell et al. | 296/24.34 |

FOREIGN PATENT DOCUMENTS

| | | | |
|---|---|---|---|
| FR | 2859424 A1 | | 3/2005 |
| FR | 2938481 A1 | * | 5/2010 |
| JP | 2002283926 A | * | 10/2002 |
| JP | 2009166836 A | * | 7/2009 |
| WO | 95/29552 A1 | | 11/1995 |

* cited by examiner

VEHICLE EQUIPMENT FOR A MOBILE APPLIANCE

FIELD OF THE INVENTION

The present invention relates to the field of motor vehicle interior equipment.

BACKGROUND OF THE INVENTION

At the present time, attempts are being made to communicate with and/or use electronic appliances inside vehicles.

Thus, a vehicle equipment designed to detachably hold an electrically powered electronic appliance provided with a display screen and manually activatable function keys has already been proposed.

However, recharging the appliance once it has been mounted on the equipment and, to this end, preparing the equipment in such a way that this operation can easily be performed afterwards, has hitherto not been provided for adequately.

Adapting the equipment to suit the type of appliance (size, connectivity, fragility, manipulation, accessibility in particular) has not been taken into consideration either.

SUMMARY OF THE INVENTION

Hence, in order to provide an at least partial solution to these problems, while at the same time offering low design/manufacture/installation costs, it is here proposed that the aforementioned equipment should have a cavity designed to hold the appliance and which for that purpose is open at the front, this cavity containing thrust means in order to wedge the electronic appliance therein, and a cable guide shoe, urged by at least some of the thrust means and having a passage, or a marked-out passage ready to be cut out through which a lead and its connector for connecting to the electronic appliance can pass.

Other targeted issues are those of making it more practical to pass the lead through and of providing ease of access to the appliance which is also held firmly in the cavity. To this end, it is advisable for this cavity to be bordered around the front by a façade part through which there passes a frontal opening designed to allow the electronic appliance to be fitted into said cavity and up behind which this appliance then presses under the effect of said thrust means which comprise:
- a rear pusher mounted in the back of the cavity and designed to push the appliance toward the façade part,
- and lateral pushers mounted on the lateral edge of the cavity, behind the façade part, and designed to push the appliance toward the opposite side,
- and the cable guide shoe is engaged in or incorporated into the rear pusher and the lateral pusher situated on the face of the region of the appliance where the latter is designed to be connected to the connector of its connecting lead, in order to move with them.

Because portable computer equipment is evolving rapidly, this type of appliance is not excluded here. However, at the date of filing, the appliance held in the equipment is in theory designed to be one of the following: a portable telephone, a personal organizer, a satellite navigation system display.

Further, bearing in mind the design trends of this type of appliance, provision is made for its display screen and its keys preferably to be accessible and functional on the façade, both when the appliance is active and when it is on standby.

Thus, this type of appliance in a "slider" or "folding" format is non-preferred, not because it cannot be held, but because it would have to be taken out of the cavity in order to be used.

This selectivity is associated with a search for a balance between the cost of the solution and the number of appliances on the market covered, with a view to it being possible for the appliance to be used while it is housed in the cavity.

In this respect, another feature of the invention makes provision for that part of the equipment made of soft material to be interchangeable and corresponds to a collar detachably mounted on the plate, which is at least essentially made of harder) material than the collar.

The solution put forward above allows the electronic appliance concerned to be held and recharged with ease (actions that come naturally) and without risk to itself (soft material that does not scratch), while at the same time offering a region with ease of access, especially if, as it is preferred, the equipment forms part of the instrument panel of the vehicle, in a near-vertical façade region thereof, typically in the central part, which is therefore very readily accessible both to the driver and to the front-seat passenger.

The invention also covers an assembly comprising a vehicle equipment of the aforementioned type detachably holding the chosen electronic appliance (of the aforementioned type), in which a cable guide shoe is therefore urged by at least some of said thrust means, the connecting lead for this appliance passing through its outlet passage for the connector connected to the appliance.

BRIEF DESCRIPTION OF THE DRAWINGS

Other features and advantages of the present invention will become further apparent from reading the following description, given by way of illustrative and nonlimiting example, and made with reference to the attached drawings in which.

DETAILED DESCRIPTION OF THE INVENTION

Figure 1:
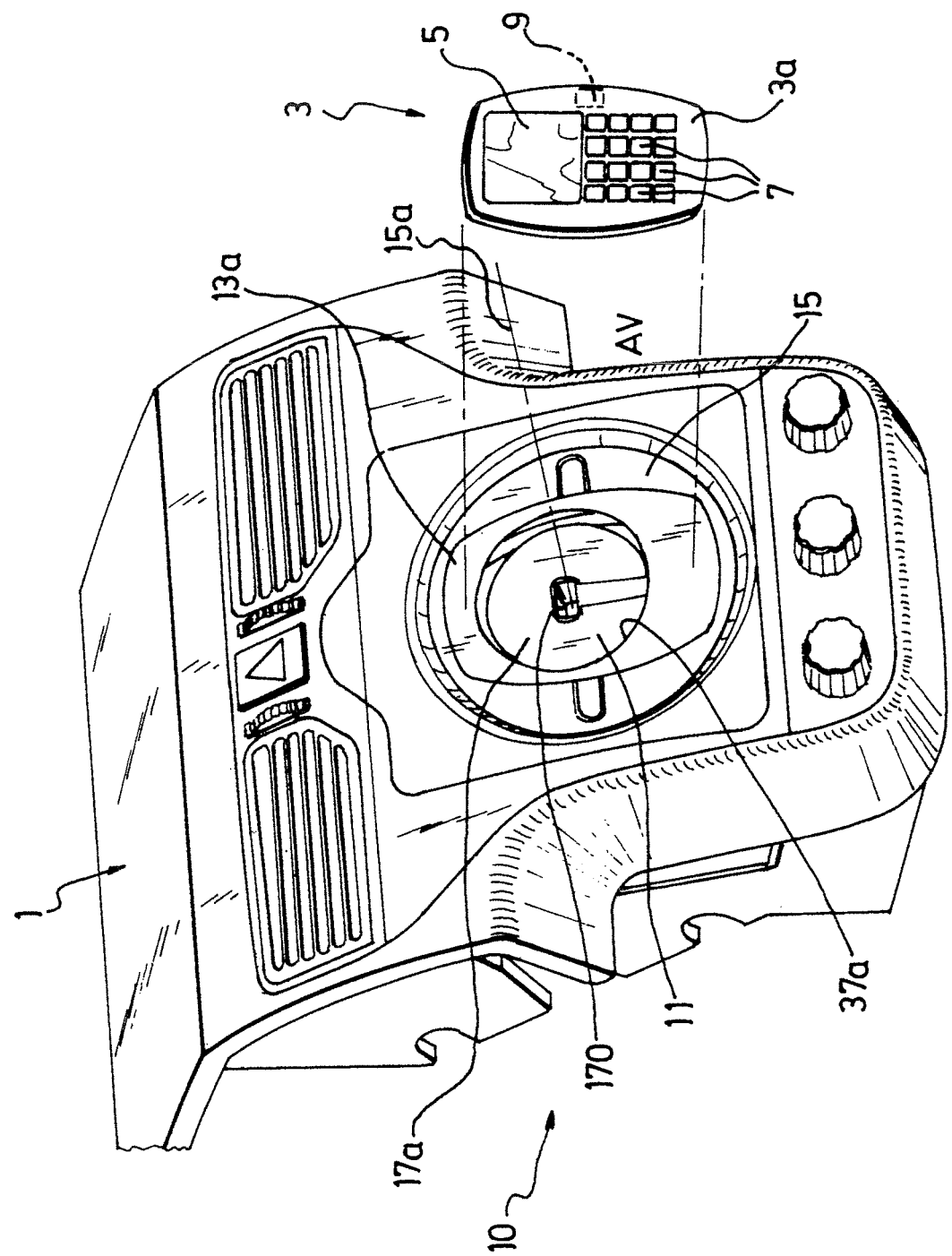
FIGS. 1, 3 illustrate part of an instrument panel provided with the equipment according to the invention, which holds the appliance that has been chosen.
Figure 3:
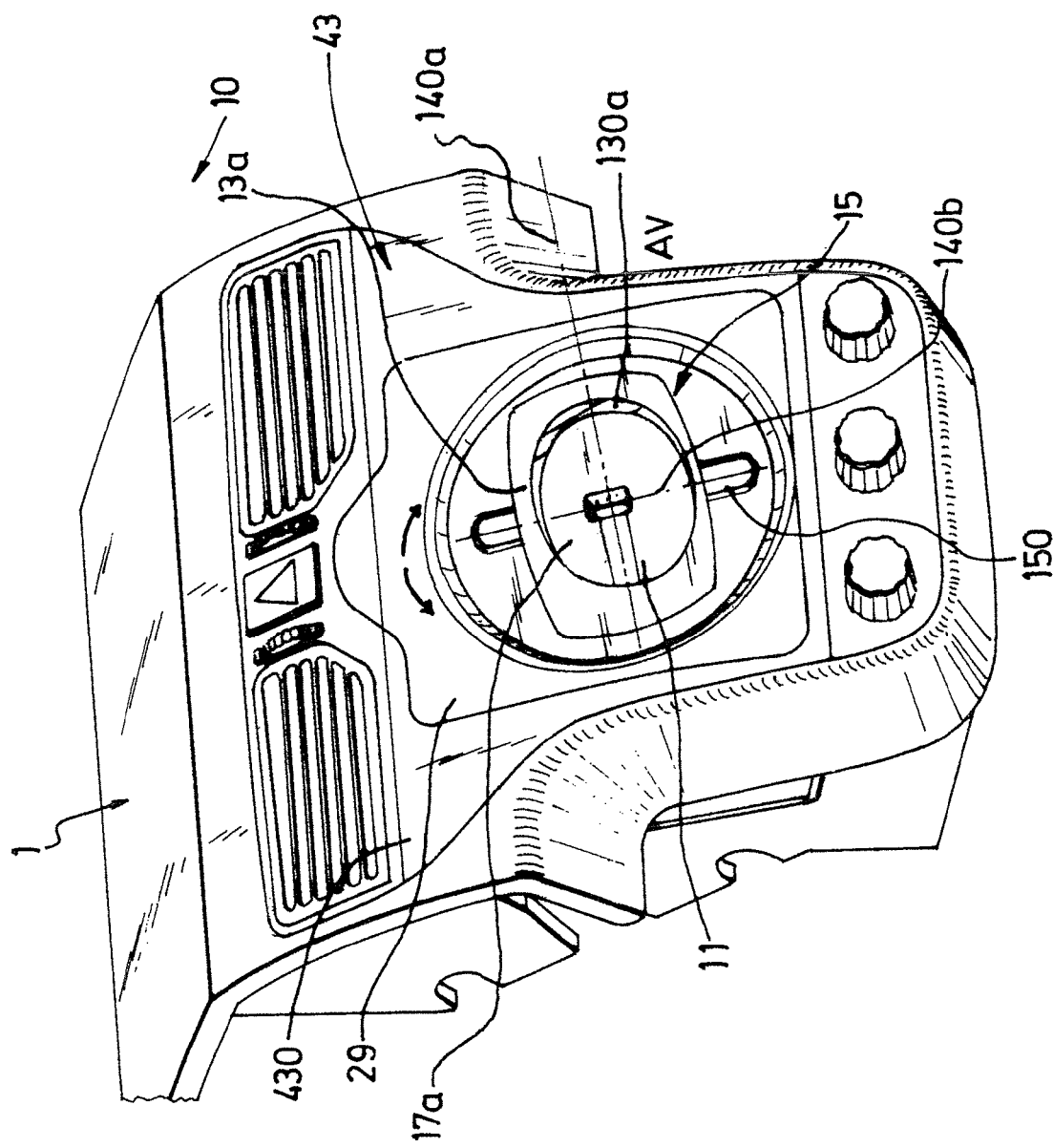
Figure 4:
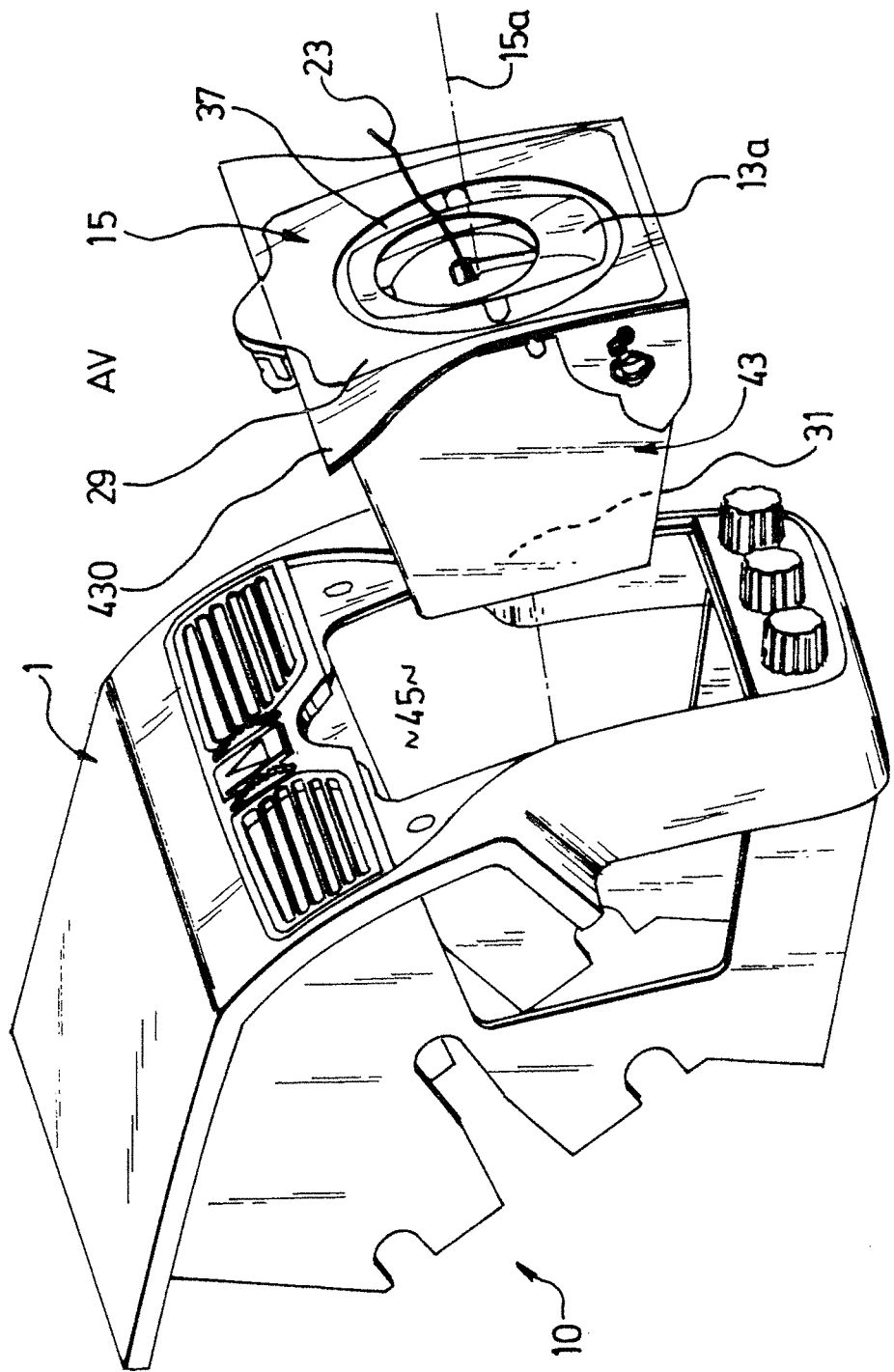
FIG. 4 illustrates the compartment door unit ready to be mounted on the relevant part of the instrument panel.

A central part of the console or façade of the instrument panel 1 of a motor vehicle 10 is schematically depicted in FIGS. 1, 3, 4 in particular.

This is a piece of equipment designed to detachably hold an electronic appliance 3 provided with a display screen 5 and manually activatable function keys 7. It is powered by a rechargeable battery 9.

Particularly in FIGS. 1, 3, it may be seen that this equipment has a cavity 11 in which the appliance 3 is held (practically) without play, allowing the appliance to be wedged therein.

In the embodiment illustrated, the equipment has been optimized to hold, by way of appliance 3: a mobile telephone or a personal organizer or a satellite navigation system display.

Further, bearing in mind the retaining means adopted again in this preferred embodiment, it is advisable to use such an appliance, the screen 5 and the keys 7 of which are accessible and functional on the façade, both when the appliance is active and when it is on standby, that is to say an appliance of the "conventional" type (therefore which can be opened/closed without sliding or folding).

In particular, in order to hold this type of appliance and allow it to be functional and operable from this point by an occupant seated in one of the front seats of the vehicle, the cavity 11 is open at the front (AV) where it is bordered by a part 13a made of soft material connected to a plate 15 mounted so that it can rotate about an axis 15a that is transverse to the back of the cavity. The softness may be of the order of 70 to 80 Shore A, the other hard materials having a hardness of twice that or more.

Figure 2:
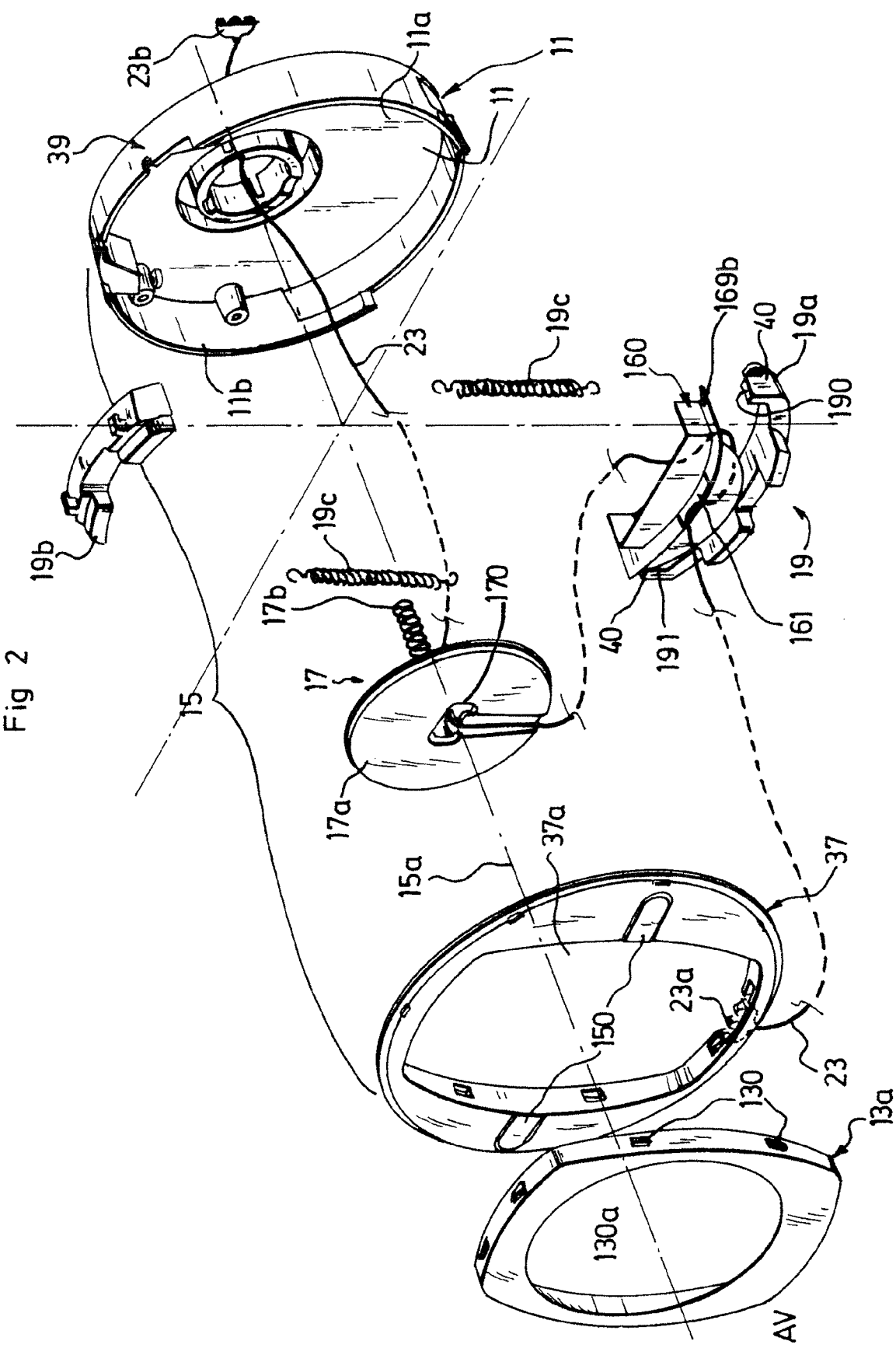
FIG. 2 is an exploded view of part of this equipment.

From FIG. 1 in particular it may be seen that the dimensions of the appliance and of the equipment (particularly the cavity and soft part 13a) are matched to one another in such a way that, when mounted in the cavity 11, the appliance 3 presses up behind and/or against this soft part 13a under the effect of first and second thrust means 17, 19 respectively (see FIG. 2).

Preferably, the appliance 3 will thus press up behind said soft part 13a, against the rear face of its frontal wall surrounding its central orifice.

As shown, the thrust means for that respectively comprise a rear pusher 17a mounted in the back 11a of the cavity 11 and lateral pushers 19a, 19b mounted on the lateral edge 11b of the cavity in order to move parallel to it.

The rear pusher 17a comprises first return means 17b designed to push it forward, therefore with the appliance. Preferably, this force will be strong enough so that when the appliance is mounted in the cavity (FIGS. 1, 3) it can be operated by pressing its keys 7 when these face toward the user (toward the front AV).

As for the lateral pushers 19a, 19b, these are therefore present behind the part 13a made of soft material and in this instance are provided with second return means 19c designed to push them, with the appliance, toward the opposite side.

Two diametrically opposed lateral pushers are advisable (although a single one that pushes the appliance against the opposite lateral edge 11b of the cavity might also be suitable).

The first and second return means may be springs.

It is recommended that the part made of soft material 13a be a collar 13a, the central opening 130a of which holds the appliance and which is mounted detachably on the plate, which is at least essentially made of hard material (typically a medium-density or high-density plastic).

For optimum use of the appliance, it is further recommended that, when placed in the cavity 11, it is in a condition that is connected detachably to a first connector 23a of an electric lead 23 comprising a second connector 23b connected detachably to a fixed power outlet 25 (FIGS. 5 and 6) of the vehicle for example which outlet is connected to the electrical power supply circuit 27 of this vehicle (via the battery). This connection can also be used for making any hard-wired connection to the vehicle.

Figure 5:
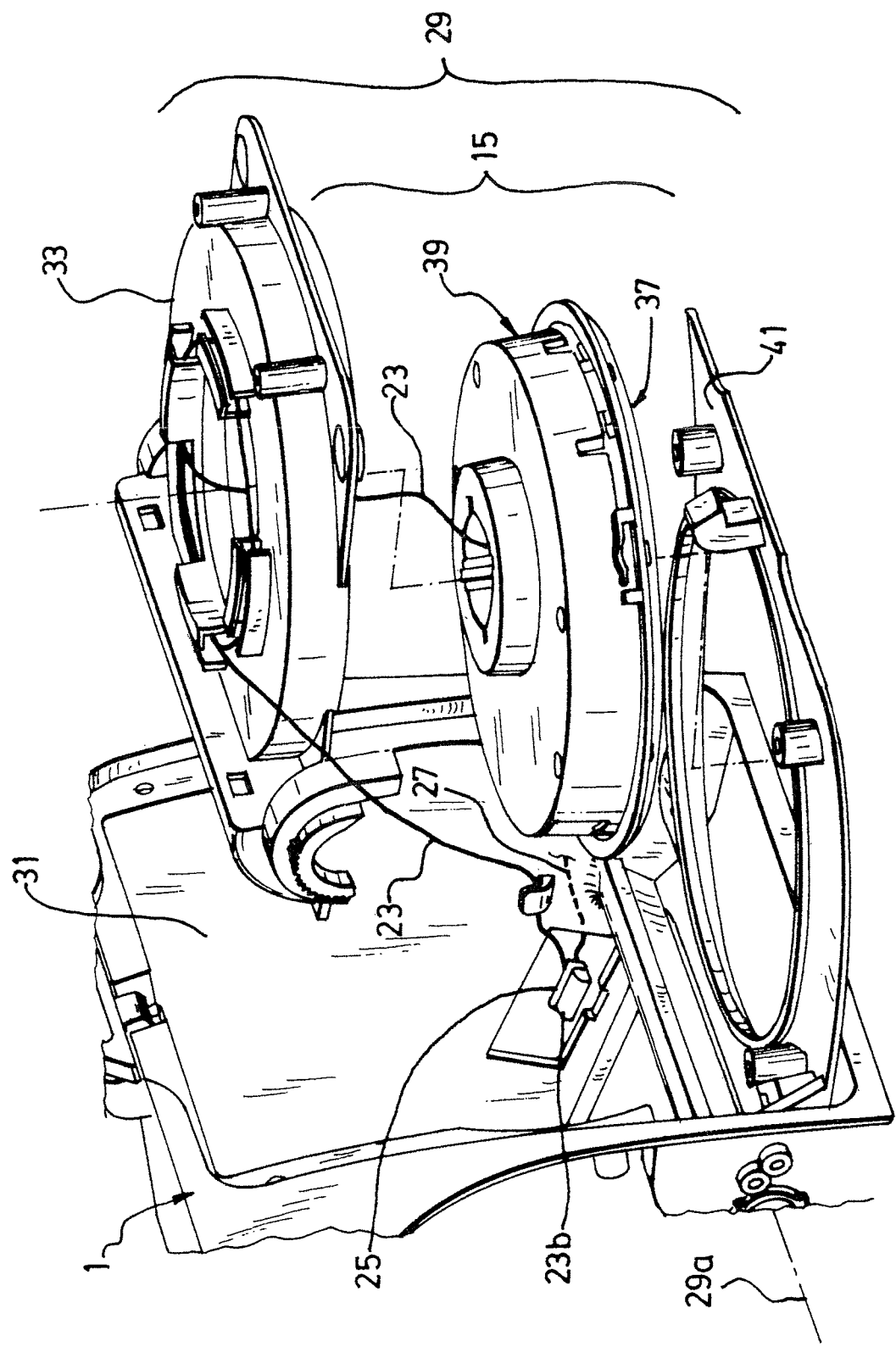
FIGS. 5, 6 illustrate details of this compartment door in the open position, pivoted forward.
Figure 6:
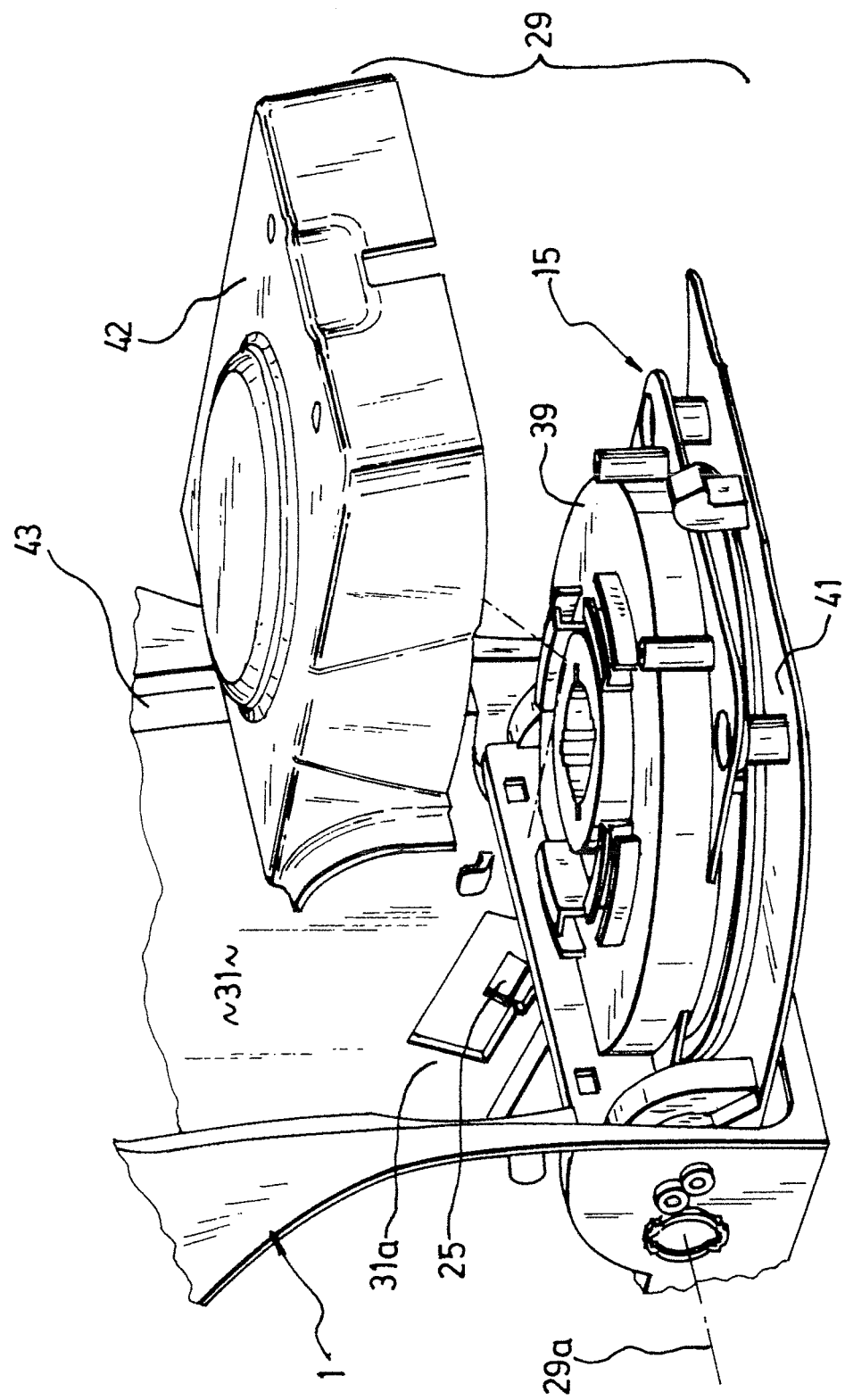

From FIG. 5 in particular, it may be seen that the equipment that holds the appliance will preferably belong to a compartment door 29 mounted in an articulated manner 29a on a near-vertical part of the façade of the instrument panel 1.

As it pivots about a horizontal axis 29a, the compartment door 29 closes and opens a storage binnacle 31 in one wall 31a (FIG. 6) of which the fixed power outlet 25 is situated.

From FIG. 2 in particular, it may also be seen that the electric lead 23 will preferably pass through the rear pusher 17a (orifice 170) along said axis 15a that is transverse to the back 11a of the cavity 11, and is wound up at the rear of a cup-shaped part 33 (FIG. 5) situated behind the rotary plate 15.

In a number of the figures, it may also be seen that the plate 15 will preferably be provided at the front with protrusions 150 able to cause it to pivot with the part 13a or 13b made of soft material and the appliance 3 mounted therein.

From FIGS. 1-3, 5, 6 in particular it may further be noted that this plate 15 is, in this preferred embodiment, mounted such that it can rotate with said soft part 13a, with respect to said cup-shaped part 33 situated behind it and in which it is engaged.

As for the rotary plate, it in this instance comprises, joined together:
  a façade ring 37 in the central opening 37a of which said soft part 13a is detachably mounted,
  and an intermediate cup 39 which bounds the cavity 11 and the back 11a of which consequently holds the rear pusher 17a and the lateral wall 11b of which holds the lateral pusher(s) 19a, 19b.

In order to hold the chosen electronic appliance securely, it is also advisable for at least one of these lateral pushers to be in the form of a jaw with lateral raised edges 190, 191 (FIG. 2) directed toward the cavity 11 and between which an edge, in this instance the edge 3a, of said appliance is held. Two blocks, one fixed and the other movable, situated facing one another and one of which is provided with the jaw 40, are shown here. Thus, when mounted in the cavity, the appliance concerned is engaged fairly snugly in this jaw which positions it optimally.

The angle through which the rotary plate can turn will preferably be 90°, or even 2×90°, so that a vertical position (FIG. 1) and a horizontal position (FIG. 2) in which the screen is therefore lying down horizontally are available, the latter position typically being best for "navigation/identification" purposes.

As far as the compartment door 29 that can bear the rotary plate is concerned, it comprises a front panel 41 rotating about the horizontal axis 29a and in the central orifice of which the rotary plate 15 is positioned. A rear cover 42 (FIG. 6) protects everything and conceals the rear of the cup 33 that carries the wound lead 23.

The aforementioned various parts of the compartment door may be screwed together.

The detachable connection between the flat façade ring 37, made of hard plastic, and the soft collar 13a can be made through the agency of snugs 130 (FIG. 2) that form clips.

The assembly comprising the compartment door 29 (FIG. 4), the rotary plate 15 and the block 43 to which this compartment door is articulated and which has a façade 430 surrounding the compartment door on the front face AV of the console 1 will preferably thus be designed to be easy to manufacture and fitted in a space 45 which in this instance is reserved for it in the middle of the console.

According to one important feature, FIGS. 2 and 7-9 show a cable guide shoe 160 urged by at least some of the thrust means 17, 19 and having a passage, or a marked-out passage ready to be cut out, 161, through which the lead 23 and its connector 23a for connecting to the appliance 3 can pass. The purpose of such connection may be to electrically power the appliance 3 and/or to establish a simple wired connection.

Figure 7:
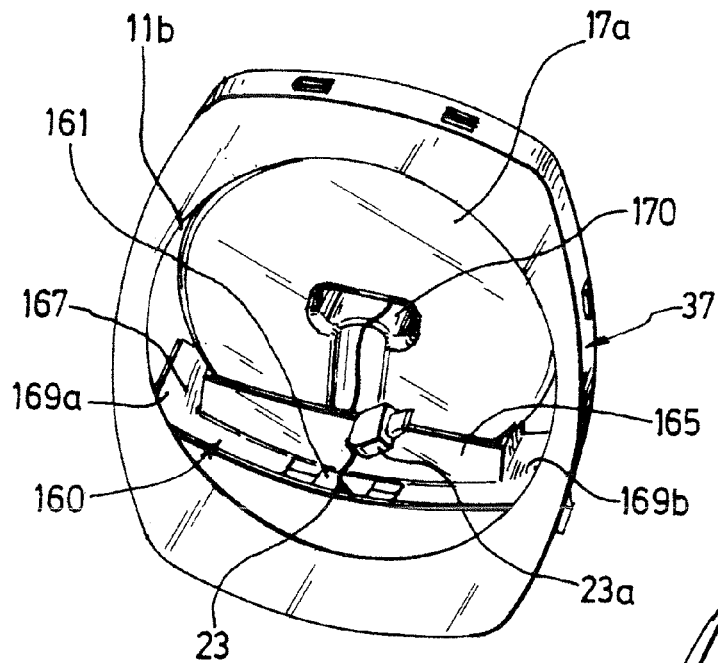
FIGS. 7, 8, 9 illustrate details of the cable guide shoe.
Figure 9:
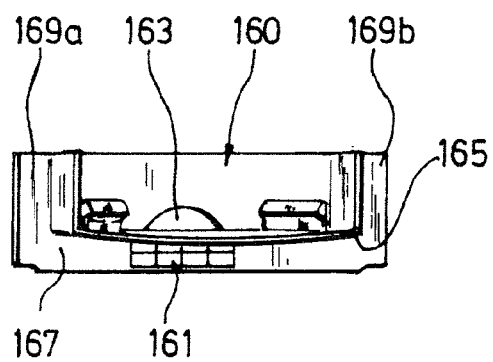

From FIGS. 7 and 9 it may be seen that, when not cut out, the passage 161 preferably takes the form of a fine divisible, in this instance rectangular, grating ready to be cut to the desired dimensions.

As far as the lateral pusher(s) (19a, 19b, 19c) mounted on the lateral edge of the cavity behind the façade part are concerned, it is advisable for this/these to act on or incorporate said cable guide shoe 160 so that it/they move therewith. In the adopted preferred solution, only the lateral lower pusher 19*a* thus acts on the shoe 160.

Preferably, the same will be true of this cable guide shoe and the rear pusher 17 mounted in the back 11*a* of the cavity 11.

For that, the shoe 160 is provided with a front skirt 165 which stands up on three sides which, at the front and from beneath, border the plate of the pusher 17*a,* just set back from the passage 161.

Preferably, the cable guide shoe will even be engaged in or incorporated into the rear pusher and the lateral pusher situated on the face of the region of the appliance where the latter can be connected to the aforementioned connector 23*a,* again for the purposes of moving with them.

Figure 8:
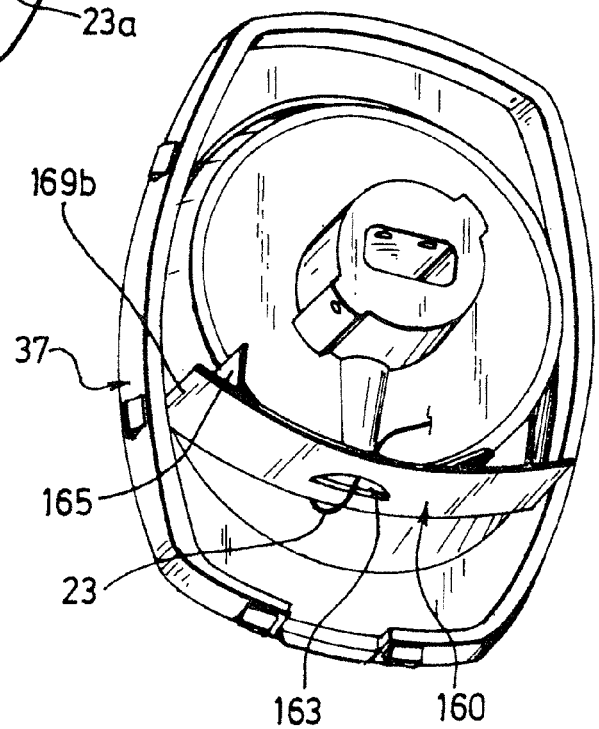

As far as the rear pusher specifically is concerned, FIGS. 7-8 show that it will be practical for the cable guide shoe to be engaged in front of and behind the plate 17*a* of this pusher where it will then preferably have two said passages and/or marked-out passages 161, 163 respectively, through each of which the lead 23 and its connector 23*a* can pass.

Thus, the shoe 160 will preferably have a dished plate shape 167 through which the passages 161, 163 pass (can pass) and between which the retaining skirt 165 lies.

It is advisable for the cable guide shoe 160 to be made, at least essentially, of a soft material with a hardness of between 40 and 80 Shore A, thus limiting the risks of scratches and "hard" contact with the appliance 3.

As illustrated in FIGS. 2 and 7-9, provision is made for the cable guide shoe preferably laterally to have articulated strips 169*a,* 169*b* which, under the thrust of the lateral pusher into which it is incorporated or which acts on it, deform, rubbing against the lateral edge 11*b* of the cavity 11.

From FIGS. 1 and 5 it will also be understood that, when placed in the cavity 11, the appliance is connected detachably to its connector 23*a* while the second connector 23*b* is connected detachably to the fixed power outlet 25 of the vehicle with which outlet the equipment is provided and which, for example, is connected to the circuit 27 of the vehicle.

The invention claimed is:

1. A vehicle equipment designed to detachably hold an electrically powered electronic appliance (3) provided with a display screen (5) and manually activatable function keys (7), the equipment having a cavity (11) designed to hold the appliance (3) and which for that purpose is open at the front, this cavity (11) containing thrust means (17, 19) in order to wedge the electronic appliance (3) therein, and a cable guide shoe (160), urged by at least some of the thrust means (17, 19) and having a passage, or a marked-out passage ready to be cut out (161, 163) through which a lead and its connector (23*a*) for connecting to the electronic appliance (3) can pass, said equipment being characterized in that the cavity (11) is bordered around the front by a facade part (13*a,* 13*b,* 15) through which there passes a frontal opening (37*a*) designed to allow the electronic appliance (3) to be fitted into the cavity (11) and up behind which this appliance (3) then presses against one edge of the cavity (11), under the effect of said thrust means (17, 19) which comprise a rear pusher (17*a,* 17*b*) mounted in the back (11*a*) of the cavity (11) and designed to push the appliance (3) forward, the cable guide shoe (160) being engaged in or incorporated into the rear pusher (17*a,* 17*b*) in order to move therewith.

2. The equipment as claimed in claim 1, characterized in that the cable guide shoe (160) is engaged in front of and behind the rear pusher (17*a,* 17*b*) in order to move therewith and in front of and behind this rear pusher (17*a,* 17*b*) has two said passages and/or marked-out passages (161, 163) through which the connecting lead and its connector (23*a*) can pass.

3. The equipment as claimed in claim 1, characterized in that the cable guide shoe (160) is at least essentially made of a soft material with a hardness of between 40 and 80 Shore A.

4. The equipment as claimed in claim 1, characterized in that the cable guide shoe (160) laterally has articulated strips (169*a,* 169*b*) which, under the thrust of the lateral pusher (19*a,* 19*b,* 19*c*) into which it is incorporated or which acts on it, deform, rubbing against the lateral edge of the cavity (11).

5. The equipment as claimed in claim 1, further comprising: lateral pushers (19*a,* 19*b,* 19*c*) mounted on the lateral edge (11*b*) of the cavity (11), behind the facade part, and designed to push the appliance (3) toward the opposite side.

6. The equipment as claimed in claim 5, characterized in that the cable guide shoe (160) is engaged in front of and behind the rear pusher (17*a,* 17*b*) in order to move therewith and in front of and behind this rear pusher (17*a,* 17*b*) has two said passages and/or marked-out passages (161, 163) through which the connecting lead and its connector (23*a*) can pass.

7. An assembly comprising a vehicle equipment detachably holding an electrically powered electronic appliance (3) provided with a display screen (5), with manually activatable function keys (7) and with a power supply lead (23), the equipment having a cavity (11) in which the appliance (3) is held and which for that purpose is open at the front, the equipment comprising thrust means (17, 19) which wedge the electronic appliance (3) in this cavity (11), and a cable guide shoe (160), urged by at least some of the thrust means (17, 19) and having a passage through which the lead and its connector (23*a*) connected to the electronic appliance (3) can pass, said equipment being characterized in that the cavity (11) is bordered around the front by a facade part (13*a,* 13*b,* 15) through which there passes a frontal opening (37*a*) designed to allow the electronic appliance (3) to be fitted into the cavity (11) and up behind which this appliance (3) then presses against one edge of the cavity (11), under the effect of said thrust means (17, 19) which comprise a rear pusher (17*a,* 17*b*) mounted in the back (11*a*) of the cavity (11) and designed to push the appliance (3) forward, the cable guide shoe (160) being engaged in or incorporated into the rear pusher (17*a,* 17*b*) in order to move therewith.

8. The assembly as claimed in claim 7, characterized in that said lead (23) passes through a rear pusher (17*a,* 17*b*) with which the thrust means (17, 19) are provided in the back of the cavity (11) so as to push the appliance (3) forward, the lead also being wound up behind a cup-shaped part (33) situated behind the rear pusher (17*a,* 17*b*).

9. The assembly as claimed in claim 7, characterized in that, placed in the cavity (11), the appliance is connected detachably to a first connector (23*a*) of the said lead (23) comprising a second connector (23*b*) connected detachably to a fixed power outlet (25) of the vehicle with which outlet the equipment is provided.

10. The assembly as claimed in claim 9, characterized in that said lead (23) passes though a rear pusher (17*a,* 17*b*) with which the thrust means (17, 19) are provided in the back of the cavity (11) so as to push the appliance (3) forward, the lead also being wound up behind a cup-shaped part(33) situated behind the rear pusher (17*a,* 17*b*).

\* \* \* \* \*